Figure 1:
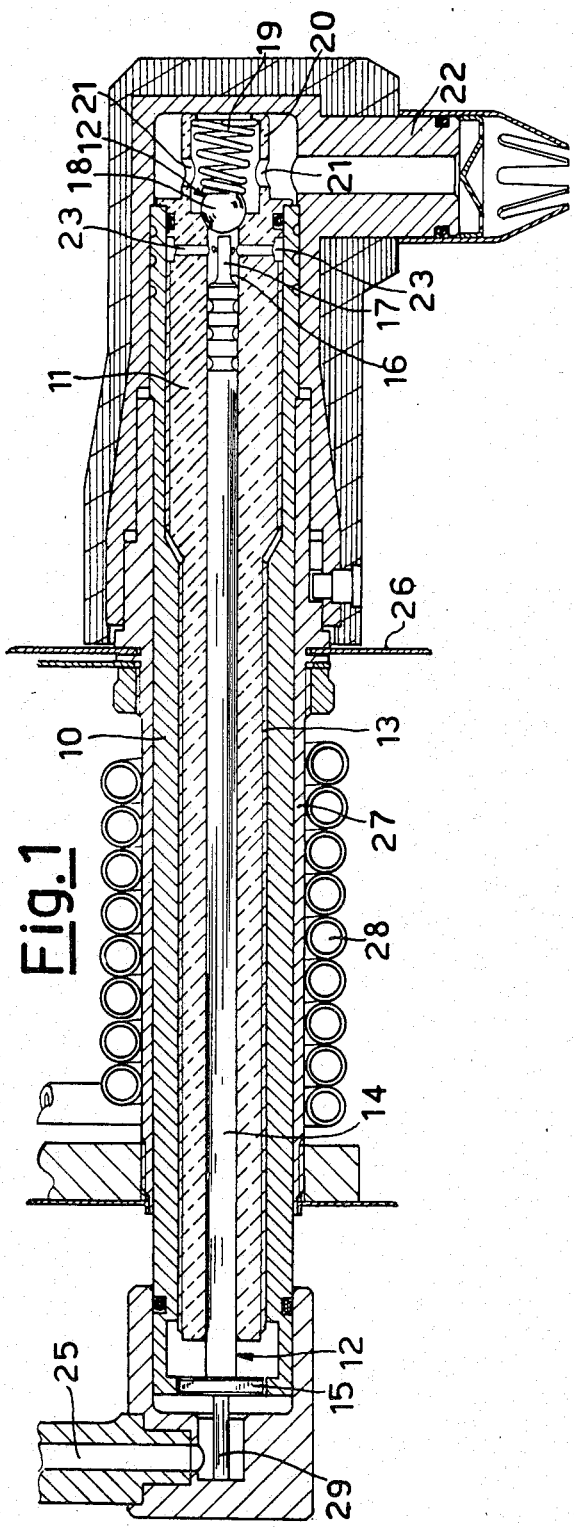

United States Patent [19]

Bravo

[11] Patent Number: 4,668,098
[45] Date of Patent: May 26, 1987

[54] HOMOGENIZER DEVICE WITH IMPROVED VALVE FOR PREPARING WHIPPED CREAM

[75] Inventor: Francesco Bravo, Montecchio Maggiore, Italy

[73] Assignee: Bravo, S.p.A., Vincenza, Italy

[21] Appl. No.: 796,232

[22] Filed: Nov. 8, 1985

[30] Foreign Application Priority Data

Nov. 30, 1984 [IT] Italy .............................. 23942/84[U]

[51] Int. Cl.[4] .......................... F16K 21/04; B01F 5/06
[52] U.S. Cl. .................................. 366/182; 137/512.1; 366/336
[58] Field of Search .............................. 366/182, 336; 137/512.1

[56] References Cited

U.S. PATENT DOCUMENTS 3,815,789  6/1974  Carpigiani ...................... 366/182 X
4,484,597 11/1984  Bravo ................................. 366/336

Primary Examiner—Louis K. Rimrodt
Attorney, Agent, or Firm—Shlesinger, Fitzsimmons & Shlesinger

[57] ABSTRACT

A homogenizer device for the production of whipped cream comprises an external sleeve (10) and an internal sleeve (11) between which is formed a labyrinth (13) in which the air-emulsified whipped cream is fed under pressure through an upstream conduit (25) and then delivered in a homogenized condition in a downstream position through a dispensing spout (22). The internal sleeve (11) features an axial bore (16) within which slides a stem (14) which is provided at its upstream extremity with an actuating piston (15) which also controls an aperture (24) providing communication between the delivery conduit (25) and the labyrinth (13). At its downstream extremity, the stem (14) acts on a separate valve (18) which is under tension from a spring (19) and which controls the outlet of the axial bore (16) communicating between the labyrinth (13) and the dispensing spout (22).

2 Claims, 2 Drawing Figures

U.S. Patent  May 26, 1987  4,668,098

HOMOGENIZER DEVICE WITH IMPROVED VALVE FOR PREPARING WHIPPED CREAM

It is known to persons skilled in the art that the fundamental component of a machine for producing whipped cream is the homogenizer device. This device is the source of the more formidable technical problems that require to be solved if the machine is to function satisfactorily and the whipped cream to be of superior quality.

One of such problems concerns the embodiment of the valve element downstream of the labyrinth, through which the basic liquid mixture, emulsified with air, is pumped.

For the said valve element must ensure a perfect seal when the machine is idle, without undesirable losses of residual cream, and must at the same time give instant opening without calling for excessively high pump delivery pressures to overcome the tension of the springs which keep the valve closed.

The requirements which the valve element controlling product delivery is required to satisfy are, therefore, conflicting.

Solutions to the well-known technical problem briefly described above are for example proposed in the U.S. Pat. No. 3,815,789 and European patent application No. 0,080,757, which is similar to U.S. Pat. No. 4,484,597, and to which reference may be had for any necessary clarifications of the general state of the pertinent art.

The present invention proposes a further solution to the said problem that obviates the drawbacks of the known art. In the case of the device according to the U.S. Pat. No. 3,815,789 these are chiefly the losses of cream that occur when the machine is idle, while the homogenizer described in the European application No. 0 080 757 suffers from a certain structural over-complexity.

The overall object of the present invention is to embody a homogenizer device that is structurally very straightforward, and therefore also low-cost, and which at the same time fully solves the problem of losses of residual cream when the machine is idle and likewise assures the ready opening of the valve element without undesirably altering the delivery pump operating pressure.

The homogenizer device for the production of whipped cream according to the present invention comprises an external sleeve (10) and an internal sleeve (11) between which is formed a labyrinth (13) in which the air-emulsified whipped cream is fed under pressure through an upstream delivery conduit (25) and then delivered duly texturized through a downstream dispensing spout (22). The internal sleeve (11) features an axial bore (16) containing a sliding stem (14) which at its upstream end is provided with an actuating piston (15) which also controls a communication aperture (24) between the delivery conduit (25) and the labyrinth (13). At its downstream end, the stem (14) acts on a separate valve (18) which is under tension from a spring (19) and which controls the outlet of the axial bore (16) communicating between the labyrinth (13) and the dispensing spout (22).

The structural and functional characteristics of the invention will become more apparent from an examination of the following description, referred to the appended drawings which show an illustrative embodiment of a device conforming to the innovative principles of the invention.

Figure 2:
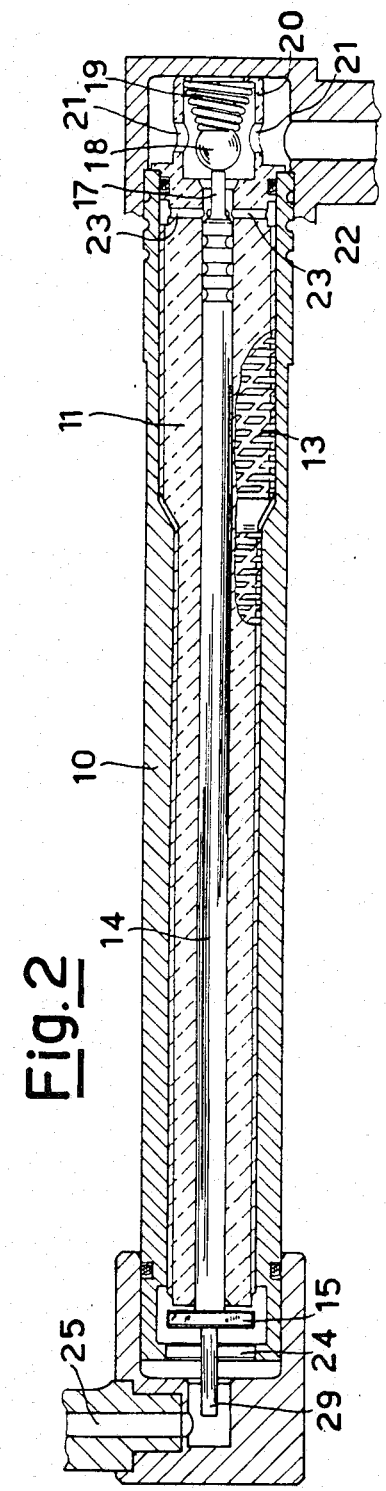

In the drawings:

FIG. 1 is a longitudinal sectional section view of a homogenizer comprising a valve element according to the invention in the closed position; and FIG. 2 is a view analogous to FIG. 1 but showing the valve element in the open position in which the whipped cream is dispensed.

With reference to the drawings, the homogenizer in question, also known as texturizer, is composed structurally of an external sleeve 10, an internal sleeve 11 and a valve element indicated overall by 12; the valve element 12 is in part axially housed within the sleeve 11.

The outer surface of the sleeve 11 is processed in a manner per se known, for example using trapezoidal teeth, to form in combination with the internal surface of the sleeve 10 a labyrinth 13 in which the basic mixture is homogenized after emulsification with air.

The valve element 12 characteristically comprises a stem 14 which is moved by a piston 15 along an axial through-bore 16 in the inner sleeve 11. At the end opposed to the piston 15, the stem 14 terminated in a tip 17 which acts on a ball valve 18 which a spring 19 maintains in a position such as to close the outlet downstream of the bore 16, which is so shaped as to receive the ball valve 18.

As is clearly seen from the drawings, the ball valve 18 with relative spring 19 is contained within a cage 20 formed in a single piece at the extremity of the internal sleeve 11.

Through a series of bores 21 the cage 20 communicates with a conventional shaped spout 22 through which the whipped cream is dispensed.

The valve 18 thus controls the passage of the whipped cream from the labyrinth 13 to the dispensing spout 22.

The labyrinth 13 communicates in its downstream portion with the bore 16 be means of a series of radial passages 23.

In its upstream portion, however, the labyrinth 13 communicates by way of a terminal aperture 24 of the sleeve 10, which aperture is controlled by the piston 15, with the delivery side 25 of a pump (not shown) which takes off the basic mixture from a reservoir, emulsifies it with air and sends it to the homogenizer device.

As is clearly seen in FIG. 1, the homogenizer device consisting of the sleeves 10, 11 and the valve element 12 is assembled to the body 26 of the machine by means of an external tube 27 comprising the coil 28 of the cooling circuit. The numeral 29 indicates a limit switch.

The functioning of the homogenizer device according to the invention apparent from the preceding description can be summarized as follows.

The air-emulsified whipped cream is forced by the pump through the delivery conduit 25 and enters the labyrinth 13 via the aperture 24 opened by the movement of the piston 15 to the position of FIG. 2, such movement being caused by the arrival under pressure of the whipped cream.

The movement of the piston 15 to the position of FIG. 2 causes a corresponding translation of the stem 14, the tip 17 of which at once removes the ball valve from its seating, thus opening the outlet of the bore 16. As a consequence of this, the whipped and homogenized cream passes from the labyrinth 13 through the bores 23 and 21 and reaches the dispensing spout 22, where it is taken off.

When the required quantity has been dispensed, the delivery pump cuts-out and the spring 19 returns the assembly composed of the valve 18, stem 14 and piston 15 to the rest position of FIG. 1.

With a valve element embodied according to the invention it is clear that the provision of a piston and relative stem for actuating of a separate valve makes it possible to employ a spring for bringing tension to bear on the valve sufficient to keep the valve at all times perfectly closed when the machine is idle.

In this way there is no escape at all of residual cream and at the same time no need undesirably to raise the operating pressure of the pump.

The object mentioned in the introductory part of the foregoing description is thus attained.

I claim:

1. In a homogenizer device for the production of whipped cream having an external sleeve and an internal sleeve between which is formed a labyrinth communicating at one end through an upstream conduit with the output of a pump to receive therefrom air-emulsified whipped cream, and then to deliver said cream in a homogenized condition to a downstream dispensing spout, the improvement comprising means including a spring loaded valve interposed between and normally closing off the opposite end of said labyrinth from said spout when said pump is not operating, and a stem mounted to reciprocate in the bore in said internal sleeve and provided at its upstream extremity with an actuating piston normally closing an aperture connecting said conduit with said labyrinth, and its downstream extremity being separate from and confronting upon said valve which is under tension from a spring, said stem being movable in response to the operation of said pump simultaneously to open said aperture and said valve to place in communication the labyrinth and the dispensing spout.

2. A device as described in claim 1, wherein the valve is a ball valve housed together with said spring within a cage formed in a single place from the end of the internal sleeve and having bores communicating with the spout.

* * * * *